United States Patent [19]

Lind et al.

[11] Patent Number: 4,697,253
[45] Date of Patent: Sep. 29, 1987

[54] SONAR HEAVE COMPENSATION SYSTEM

[75] Inventors: Earl R. Lind, Portsmouth; Ronald A. Franklin, Newport, both of R.I.

[73] Assignee: Raytheon Company, Lexington, Mass.

[21] Appl. No.: 816,036

[22] Filed: Jan. 3, 1986

[51] Int. Cl.$^4$ .......................... H04B 17/00; G01S 9/68
[52] U.S. Cl. ........................................ 367/12; 367/115
[58] Field of Search ................................. 367/12, 115

[56] References Cited
U.S. PATENT DOCUMENTS 3,017,606  1/1962  Kietz et al. .......................... 367/12
4,302,824  11/1981  Goymour ........................ 367/12 X Primary Examiner—Stephen C. Buczinski
Assistant Examiner—Melissa L. Koltak
Attorney, Agent, or Firm—Martin M. Santa; Richard M. Sharkansky

[57] ABSTRACT

A ship-borne sonar heave compensation system measures the heave at time of transmit and at the expected time of receive of a bottom-echo which is approximated by the previous depth determination corrected for heave. Using these values of heave, the depth of the detected bottom-echo is corrected to provide the true depth corrected for heave. A chart recorder reads out from memory the sonar return signals, including the bottom-echo, corrected for these heave values to present a true picture of the bottom contour.

18 Claims, 5 Drawing Figures

4,697,253

SONAR HEAVE COMPENSATION SYSTEM

BACKGROUND OF THE INVENTION

Sonar systems for transmitting and receiving sonic energy advantageously employ a recording device such as the familiar depth recorder chart which provides a continuous visable record of the depth of a reflecting surface, e.g., the sea bottom. As is well known in sonar depth measurements made from a moving ship, the depth measurements will be affected by the heave of the ship caused by ocean waves or swell. The resulting variation of depth measurement on successive depth measurements obscures the small changes in the flatness of the sea bottom by producing a sinusoidal perturbation of depth measurements of a sea bottom which is actually flat. Alternatively, the sinusoidal perturbation masks variations in the sea bottom which may actually exist. An exact knowledge of the nature of the sea bottom is required in many instances such as where pipe or cable is to be placed on the ocean floor since unsupported regions of the pipe or cable between shallower portions of the ocean bottom may induce stresses which cause the pipe or cable to break.

In the prior art a heave sensor located aboard the ship carrying the sonar has been used to sense the heave of the ship at the time of transmit. A correction to the observed depth measurement of twice the heave (the roundtrip correction) is effective for removing within acceptable limits the heave perturbation in those instances where the ship does not have much vertical movement between the time of transmit and the time at which the reflected signal is received, such as in shallow water. However, where the depth of the water is great and the vertical movement of the ship is significant between the transmit time and receive time, a problem exists in the prior art depth measuring systems in that the received signal shows an apparent substantial change in depth of the sea bottom from pulse to pulse which change obscures the nature of the sea bottom.

SUMMARY OF THE INVENTION

The foregoing problems of the prior art are overcome and other objects and advantages of sonar depth recording are provided by a system, in accordance with the invention, which comprises means for transmitting radiant energy signals toward a reflecting subject, such as the ocean bottom, means for receiving such reflected echos, and means for displaying these echos as a function of time or distance by means of a recorder, such as a graphical recorder of depth customarily used with sonar systems or a digital read-out of depth, where the depth sonic echo has been corrected to remove substantially any perturbation of the time or depth which is attributable to the heave of the vessel at the time of the transmit and receive signals. Circuits are provided for measuring the heave of the vessel at the transmit time and at the receive time which is approximated by using the true round trip time (true depth) of the previous received signal or by real time detection of the received sonic echo from the sea bottom in real time. A pingpong memory system may be used wherein one of the memories is storing raw data in sequential addresses from the uncorrected depth received signal at the same time that the other memory has its contents of raw data bulk transferred to different address locations within the memory to correct for heave at transmit and receive times. The moving stylus on the chart recorder triggers the read-out of the memory having the corrected depth data and provides this corrected depth data as a recording on the chart recorder. The corrected depth is also provided as a digital read-out signal.

BRIEF DESCRIPTION OF THE DRAWINGS

The aforementioned aspects and other features of the present invention will be apparent from the following description taken in conjunction with the accompanying drawings wherein.

DESCRIPTION OF THE PREFERRED EMBODIMENT

Figure 1A:
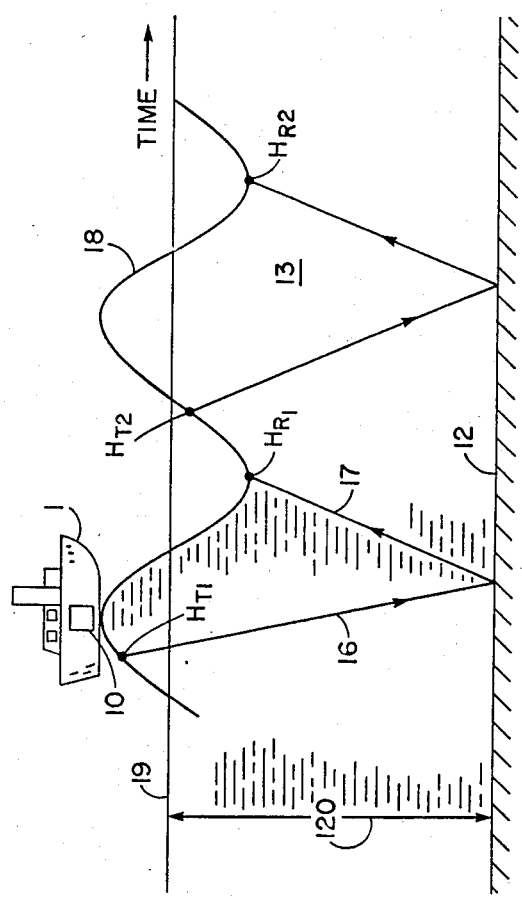
FIG. 1A is a stylized pictorial view of a ship carrying a sonar system in a deep ocean environment.

Referring to FIG. 1A, there is shown a stylized pictorial representation of a ship 1 experiencing heave because of motion of the sea 13. Because of wave and swell action of the water, the ship and hence the transducer 15 experiences a vertical displacement or heave relative to a calm surface 19 of the sea (average position) which is represented as a function of time by the curve 18. The ship 1 carries a sonar depth finder system 10 which, for deep depths 120 of sea 13, experiences significant vertical motion between its position at the time of transmission (heave at transmit) of a sonar pulse and the position at the time of reception (heave at receive) of reflected sonar energy from the sea bottom 12. It is the purpose of this invention to correct the measured depth to the true depth as measured from the average position 19 of the surface of the sea to the bottom 12 by measuring the heaves on transmit and receive and making appropriate correction to the measured depth to provide the true depth within acceptable error. FIG. 1A shows that on one transmit/receive cycle, the heave (displacement) on transmit is $H_{T1}$ and the heave on the receive is $H_{R1}$. On the next transmit/receive cycle the heave on transmit is shown as $H_{T2}$ and the heave at the time of receiving the signal is shown as $H_{R2}$. It is observed that the magnitude and sign of the heave values may change from cycle to cycle.

Figure 1B:
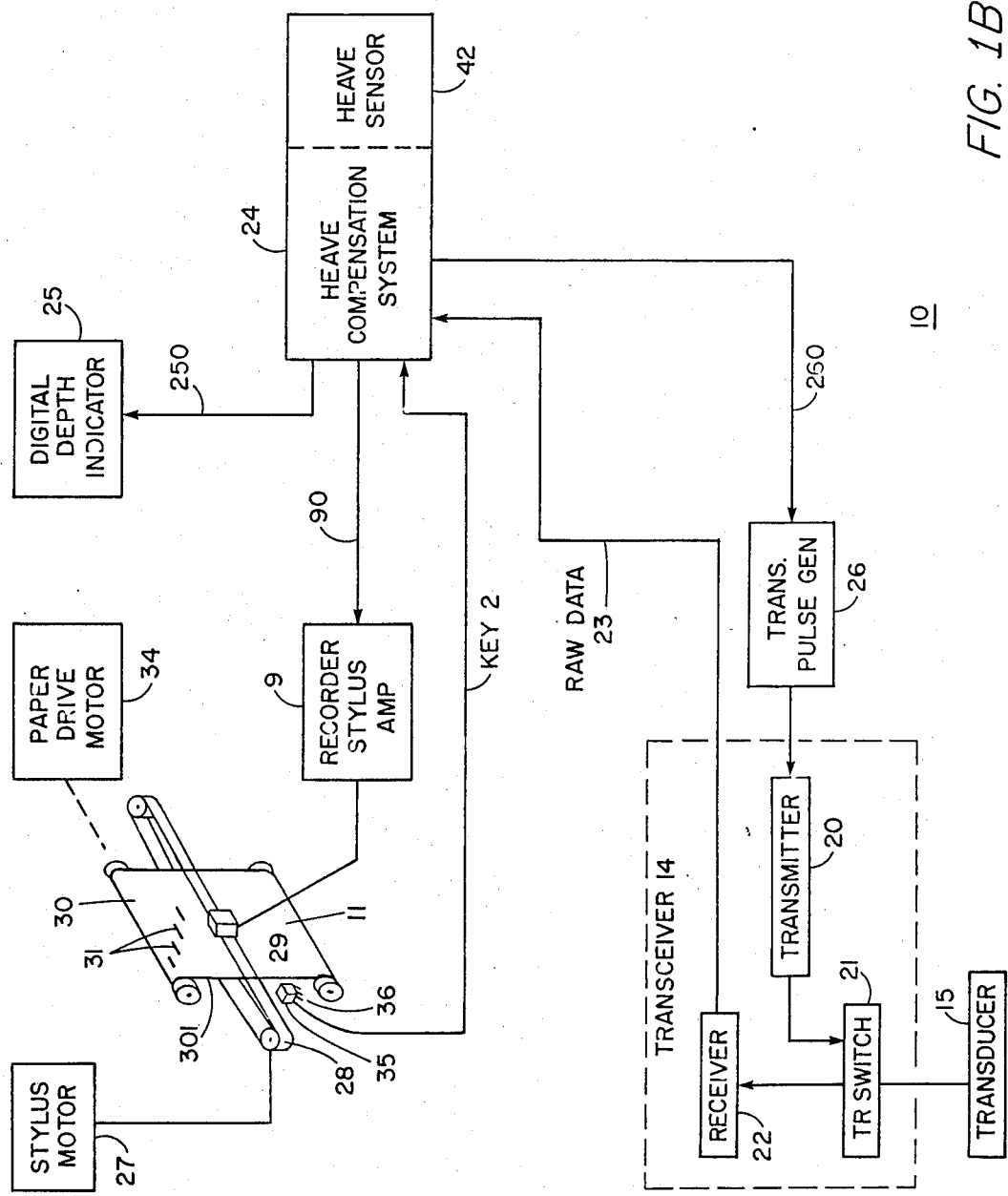
FIG. 1B is a block diagram with a partial pictorial view of a complete sonar system including the heave compensation system of this invention.
Figure 2:
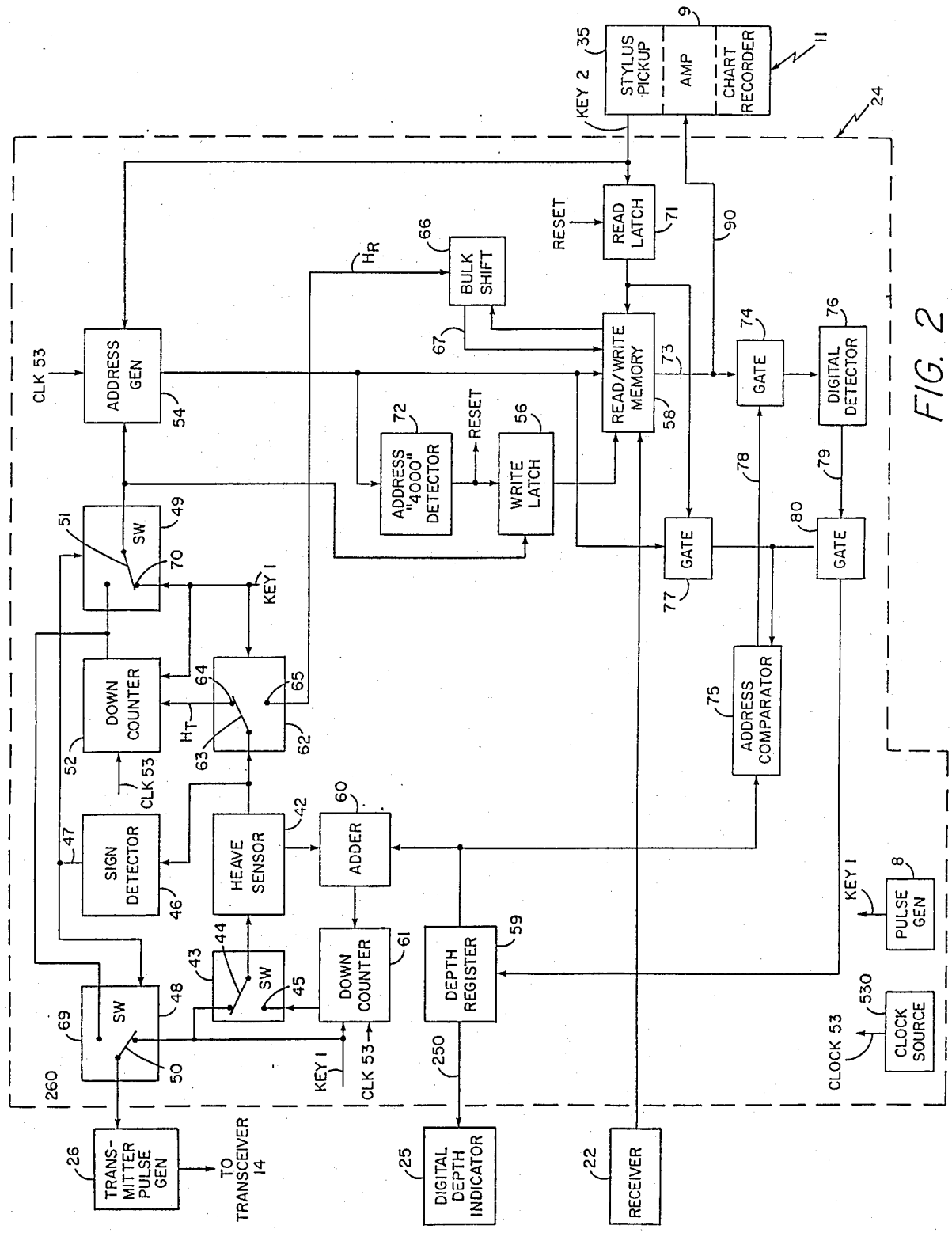
FIG. 2 is a block diagram of the heave compensation system of this invention.

Referring now to FIG. 1B, there is seen a diagramatic view of a sonar depth finder system 10 for providing a graphical recording on chart recorder 11 of the depth 120 to the bottom 12 of the sea 13. A transceiver 14 utilizes a transducer 15 for transmitting sonic energy 16 toward the sea bottom 12 and for receiving waves of sonic energy 17 which are reflected from the ocean bottom 12 to the transducer 15. The transceiver 14 is a conventional design customarily used in sonar applications and comprises a transmitter 20 which generates a pulse of sonic energy for transmission via a transmit-receive (T-R) switch 21 of conventional form to the transducer 15, and a receiver 22 for amplifying echos received from the transducer 15 via the T-R switch 21. The transducer 15 is of a well known form commonly used in sonar and is positioned on a ship 1 to be submerged within the sea 13 for coupling sonic energy into the water. The output of the transmitter pulse generator 26 is provided to the transmitter 20. The receiver 22 provides a signal, characterized as raw data, on line 23 for processing by the heave compensation system 24 to remove heave perturbation prior to being presented to the chart recorder 11 or the digital read out of depth indicator 25. In order to prevent interference with the received signal caused by reverberation reflection from a succeeding transmit pulse the transmit pulse generator 26 triggered by key 1 pulse from a free-running pulse generator 8 has a pulse period T which is at a minimum greater than the sonar pulse roundtrip time of the preceding pulse. In the description of operation of the system of FIG. 2, the pulse period T is made much longer than the roundtrip time (approximately three times longer) thereby resulting in a simplification of the description and thereby presenting the invention more clearly.

The chart recorder 11 may be of standard design having a stylus drive means comprising a stylus motor 27 and a belt 28 to which the stylus 29 is attached. The belt moves the stylus 29 along the surface of the paper 30 and the spacings of the marks 31 from the edge 301 of the paper 30 represents the scaled depth of the sea bottom 12. The paper 30 is moved slowly transverse to the path of the stylus by means of rollers 32, 33 driven by the paper advance drive motor 34. A magnetically actuable reed switch 35 is mounted on a frame 36 adjacent to the path of the stylus 29. Switch 35 is activated by a magnet on the stylus 29 near the beginning of each stroke of the stylus 29 thereby providing a key 2 pulse signal to the processor 24. The period of the key 2 pulses provided by the stylus 29 is shorter than the period of the key 1 pulses provided by timing control 37 to the transmitter pulse generator 26 so that asynchronous operation of the stylus 29 relative to the transmitter pulses is possible without any loss of receiver 22 data 23.

Figure 3:
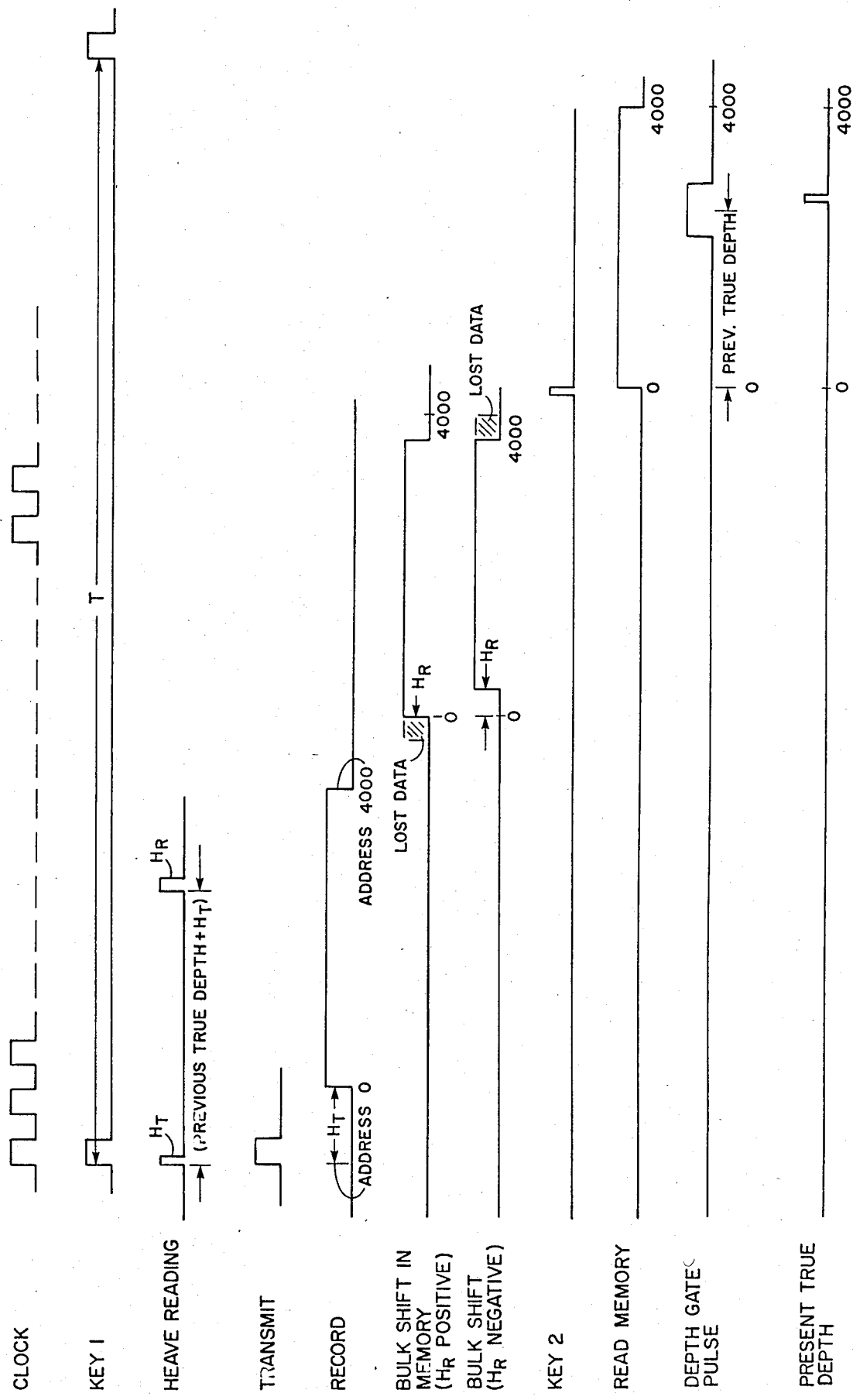
FIGS. 3 and 4 are timing diagrams illustrating operation of the heave compensation system of FIG. 2 with positive and negative transmit heave conditions, respectively.
Figure 4:
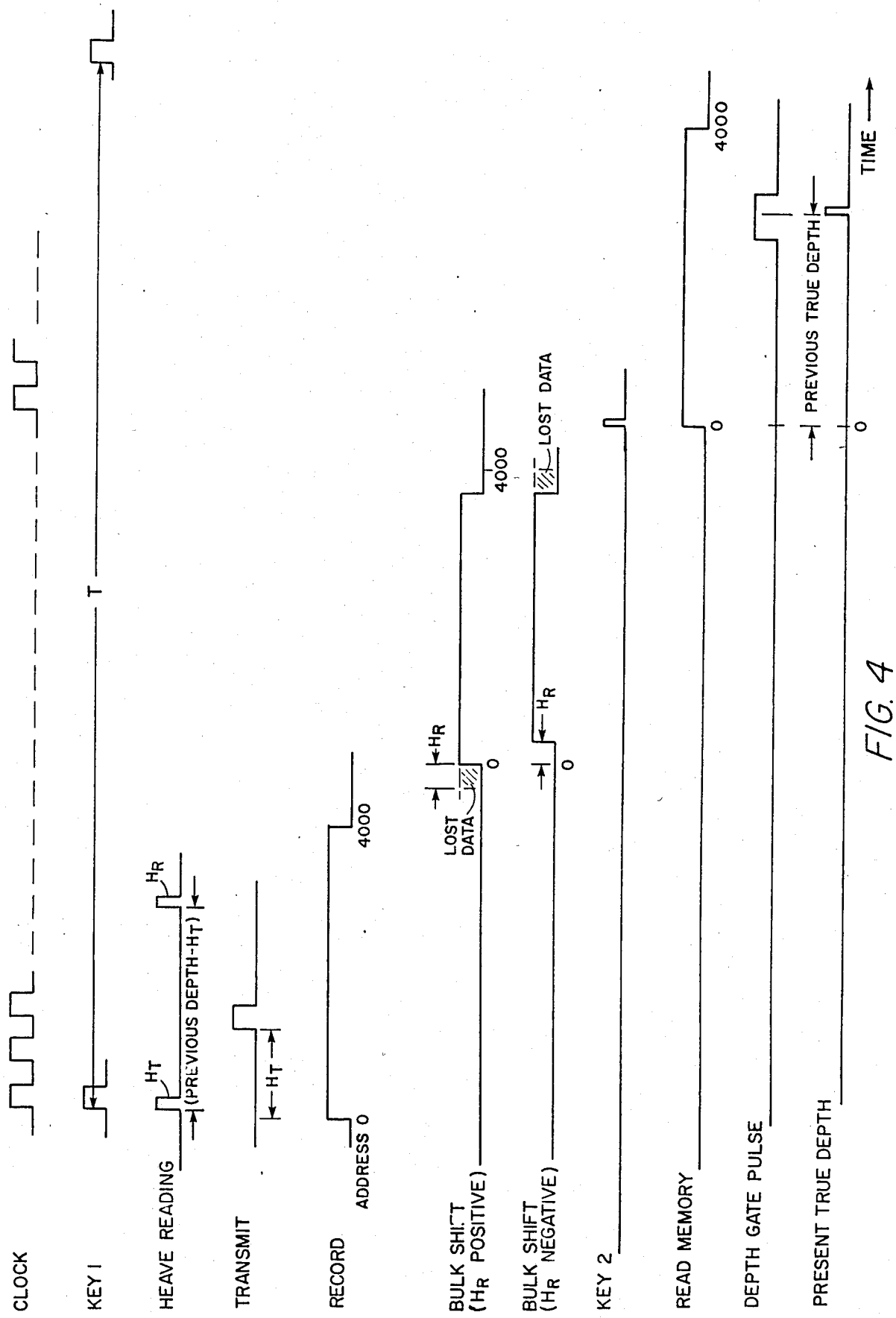

In the operation of the apparatus of this invention, reference is made to FIG. 1 where it is intially assumed that the heave on transmit $H_T$ is a positive quantity measured relative to the average position 19 of the transducer 15. The heave compensation system 24 comprises a pulse generator 41 which produces a key 1 pulse at a period T as shown in FIG. 3. The heave sensor 42 is actuated by the key 1 pulse to sense the heave of the transmitter at the time of occurrence of the key 1 pulse. The key 1 pulse is applied to heave sensor 42 through switch 43 which is responsive to the key 1 pulse to have its arm 44 temporarily assume the position shown in the Figure in response to the presence of the key 1 pulse. Otherwise, arm 44 makes contact with contact point 45. The output of heave sensor 42 is assumed to be a digital number having an amplitude and a sign, the sign being positive if the transducer is above the average position 19 at the time its position is sensed. The sign is detected in a sign detector 46 whose output controls the position of the arm 47 of switch 48. Arm 47 is in the position shown when the sign provided by detectors 46 to switch 48 is positive. The output 47 of sign detector 46 is provided as a control signal to switches 48 and 49 whose arms 50, 51, respectively, assume the position shown when the sign on line 47 is positive. In the event the sign is positive, the key 1 pulse is connected through relay 48 to the transmitter pulse generator 26 and transmission of the sonic pulse therefore occurs at the time that the key 1 pulse is provided as shown in the timing diagram of FIG. 3. The magnitude of the heave at transmit is provided as the count to down-counter 52 which is counted down at the clock rate of clock 53. When the count HT is reached, an output pulse is provided by down-counter 52 which passes through switch 49 as an input to an incrementing address generator 54. Clock 53 is provided as the incrementing source to generator 54 which will provide addresses 0 to address 4,000, for example. The pulse on the output line 55 of downcounter 52 is also supplied as a write command to a write latch unit 56 whose output 57 provides a write command to read/write memory 58, the contents of the receiver 22 for the addresses 0 through 4,000. When the address 4,000 is reached, the write latch 56 is reset so that no further information from receiver 22 will be read into the memory until the next output on line 55. It is seen that the operation of the circuitry to this point has caused the signals received by the receiver 22 to be disregarded until the time corresponding to the transmitter heave has elapsed, at which time the memory is commanded to start storing the receiver data.

The write latch 56 is set by a pulse from switch 49 provided by either a key 1 or by down-counter 52 depending upon the polarity of the heave measured at the time of the key 1 pulse. The write latch 56 is reset by a detector which determines the count "4,000" to provide the reset pulse to latch 56 thereby terminating the write command on line 57. During the time that information is being read into the memory 58, the system is performing another operation which is to determine the heave of the ship at a time which closely approximates that at which the actual bottom signal occurs. In order to do this, the depth reading corrected for heave, as determined on the previous transmit and receive cycle, is stored in a depth register 59 and is added to the depth value still stored in heave sensor 42 as measured at the time of the key 1 pulse. The value of heave sensor 42 and previous true depth register 59 are added in adder 60 and stored in the down-counter 61 in response to the applied key 1 pulse. When the down-counter 61 reaches a zero count in response to the clock pulses applied to the counter 61, a pulse is applied to contact 45 and through arm 44 to sample the heave sensor 42. It will be recalled that the arm 44 normally is in contact with the contact point 45 except when switch 43 has a key 1 pulse applied to it, in which case the arm moves to the remaining contact to thereby transfer the key 1 pulse through switch 43 to heave sensor 42. The output of heave sensor 42, in response to the pulse from down-counter 61 through switch 43, is provided to switch 62 through arm 63 to contact 65 as a $H_r$ signal at one of the outputs of switch 62. The heave at the time of the key 1 pulse $H_t$ is provided by heave sensor 42 through arm 63 to contact 64 of switch 62 in response to a key 1 pulse being applied to switch 62 which causes arm 63 to be in contact with contact 64. The $H_r$ output of switch 62 contains the amplitude and sign of the heave at the approximated time of arrival of the bottom signal. The raw data contents of the read/write memory 58 which are stored at addresses 0 through "4,000" must be shifted in memory according to the sign and amplitude of the heave sensor 42 output $H_r$. The operation of shifting the location of data in a memory is well known to those skilled in the processing of digital information as a bulk shift of the data stored in memory. A bulk shift unit 66 has an input signal $H_r$. In response to the $H_r$ signal, bulk shift unit 66 senses the sign of the $H_r$ signal from which it determines whether the contents of the memory are to be shifted to higher or lower addresses by the amount corresponding to the magnitude of $H_r$. If the sign of $H_r$ is negative, the contents are shifted to higher addresses in which case the bulk shift unit provides a read command at address 4,000 zero on the line 67 to the memory 58. The memory 58 provides the contents of address 4,000 on line 68 to the bulk shift unit 66 where the command on line 67 is a write command at address $0+H_r$. This process continues with the entire memory to the last address 0 where the contents of the address 0 is read out and transferred to address $H_r$. It is noted that in this bulk shift the original contents of memory 58 at addresses 4,000 through $4,000-H_r$ have been dropped off the end of the memory and that the memory read out has started at the highest address.

If the sign of $H_r$ had been positive, the bulk shift unit 66 would have started at the lowest address 0 and decreased the address by the magnitude of $H_r$ before writing the contents of the address at address 0 into the memory. Thus, all locations in memory from 0 through 4,000 would be read and shifted to a lower address by the magnitude of $H_r$. It is noted in this case that the contents which were originally stored in memory location 0 through $H_r$ have been rewritten in nonexistent addresses in the memory and consequently have been lost in the shift process.

After the bulk shift process provided by unit 66, the content of the read/write memory 58 at the memory location corresponding to that at which the bottom signal is stored is the same as if there had been no heave at transmit nor heave at the time of receiving the bottom signal. The operation of the heave compensation system thus far has been described for the situation where there was a positive heave at the time of the key 1 pulse in which case the transmitter was activated at the same time as the key 1 pulse, but the received signals were not recorded until a time corresponding to the heave value had expired.

In the event that the heave signal at the time of the key 1 pulse is sensed by the sign detector 46 to be a negative heave, the circuitry is configured to, in this case, delay the transmitter 20 actuating pulse for a time corresponding to the magnitude of the heave measured at the time of the key 1 pulse. Also, for this case, the raw data from the receiver 22 is immediately read into the memory 58. In order to accomplish this procedure, the negative sign appearing at the output line 47 of the sign detector 46 at the time of detection of the transmit heave $H_t$ is provided to switch 48 whose switch arm is caused to make contact with contact 69 for a negative signal at the control input 47 of switch 48. Contact 69 is responsive to the output of down-counter 52 which has stored the magnitude of $H_t$ in response to the key 1 pulse and is being counted down by the clock pulses 53. Therefore, the combination of down-counter 52 and switch 48 provide a delayed key 1 pulse to the transmitter 20. The negative output sign on line 47 from sign detector 46 causes the arm 51 of switch 49 to be in contact with contact 70 of switch 49 in which case the output of switch 49 causes the incrementing address generator 54 to be actuated and responsive to clock pulses and to actuate the write latch 56 so that the write command and incrementing addresses from address generator 54 are provided to read/write memory 58 which, in turn, stores the data provided by receiver 22 without any delay after the occurrence of the key 1 pulse. Once the data has been read into the memory 58, the heave compensation system 40 goes through the process of determining the sign and value of $H_r$ as previously described for a positive value of $H_r$.

As stated previously, after compensating for the heave on transmit and the heave at receive of the bottom signal, the contents of the memory 58 are read out in response to a key 2 pulse produced by the stylus of pulse input sensor 35 of the chart recorder 11 when the stylus passes a beginning point on the paper chart 30. The key 2 pulse applied to the address generator 54 starts incrementing the addresses applied to memory 58 from 0 to 4,000. These signals are caused to be read in response to a read latch 71 which is set by the key 2 pulse. Read latch 71 is reset by the output of the detector 72 when the last addresses 4,000 has been read out of memory 58. The output of memory 58 on line 73 is provided to the chart recorder amplifier 9 for impression upon the chart recorder paper 30, and is also supplied to a gate 74.

Gate 74 is actuated by a pulse from address comparator 75 to provide to the digital detector and pulse generator 76 output signals from the read/write memory 58 only for a predetermined range of depths centered about the previous depth determination as recorded in register 59. The address comparator 75 is provided with read addresses through gate 77 whose inputs are the read address from address generator 54 and the output of the read latch 71 which has been latched by the key 2 pulse. When the address from gate 77 is within a predetermined number relative to the number provided by depth register 59, the address comparator provides a gating pulse on line 78 to gate 74 thereby allowing the read-out signals from the memory 58 to pass through gate 74 into the digital detector and pulse generator 76. The digital detector 76 provides a pulse output on line 79 when a predetermined criteria relative to the amplitude of consecutive digital values read out of memory 58 has been satisfied thereby indicating the presence of a return signal from the sea bottom. The digital detector 76 provides a pulse on line 79 at the time of detection of the bottom which is applied as a gate pulse to gate 80 whose other input is the address provided by gate 77. The gated address provided by gate 80 is provided as a new value to the depth register 59 to be used in the next depth determination cycle of the heave compensation system 40.

Although the invention has been described in terms of counting down from the algebraic sum of the heave on transmit and the actual depth (depth measured from the average position of the transducer) as measured on the preceding cycle to determine the heave at the anticipated time of receive of the bottom echo signal, it will be apparent to those skilled in the art that for a deep sea bottom, the distance is so great (many hundreds of feet at a minimum) relative to the maximum heave values (several tens of feet) that the effect of ignoring the heave on transmit in the determination of the heave on receive of the bottom signal is minimal. The circuitry of FIG. 2 may, therefore, be simplified by the elimination of the adder 60. Down counter 61 would have as its input only the true depth of the previous transmit/receive cycle in depth register 59 output.

It will also be apparent to one skilled in the art that the system of the preferred embodiment may be modified at the expense of less efficient utilization of the memory storage capacity by recording raw received data in the memory immediately after the transmit pulse regardless of the polarity of the heave at transmit. The transmit pulse is also transmitted contemporaneously with the key (1) pulse regardless of the polarity of the heave at transmit. The algebraic sum of the heave at transmit and at the anticipated time of detection of the received bottom signal is used to bulk shift the raw received data in the memory. The shifted data in the memory is read out in response to the key (2) pulse from the recorder as described in the preferred embodiment.

In order to increase the rate at which the system just described may be operated, it will be apparent to those skilled in the art that the memory 58 may be replicated and used in a ping-pong memory system wherein one memory is having raw data written into it in real time while the other memory is having its data bulk shifted at a much faster data rate and then read out at a different rate for recording on the chart recorder. On the next transmit/receive cycle, the functions of the memories are interchanged. Thus, the system may function at twice the cycle rate of a one memory system.

Another embodiment of the invention which will be apparent to those skilled in the art is a quasi-real-time system where the data being received in real time by the sonar system is being detected at the same time as the data is being stored in the memory 58. The previous true depth value is used to provide a gate signal for a gate such as gate 74 before the detector 76. The heave sensor is sampled when the received signal threshold is exceeded or in the absence of a detected signal the previous true depth value is used instead. The value of heave on receive and the heave on transmit are summed to provide the net heave which is used to shift the data in RAM 58 by the net heave. Alternatively, the net heave can be algebraically added to the address of the address generator 54 in order to allow recorder to trigger by the key (2) pulse the read-out of memory 58 of heave corrected data.

Digital true depth may be obtained from the digital address of the memory 58 at detection of the received signal in real time as corrected by the net heave by circuitry which is well known to those skilled in the art.

Having described a preferred embodiment of the invention, it will be apparent to one of skill in the art that other embodiments incorporating its concept may be used. It is felt, therefore, that this invention should not be limited to the disclosed embodiment but rather should be limited only by the spirit and scope of the appended claims.

What is claimed:

1. In combination:
    means transmitting sonic energy at a predetermined time toward an energy reflecting surface which provides energy reflected from said surface;
    means responsive to the energy reflected at a later time from said surface for measuring the round-trip distance between said transmitting means and said reflecting surface and between said responsive means and said reflecting surface;
    said transmitting means and said responsive means moving transversely to and maintaining an average distance to said reflecting surface;
    said transmitting means and said responsive means undergoing translation relative to the average distance to said reflecting surface along the direction between said reflecting surface and said transmitting means and said responsive means;
    means measuring the translation of said transmitting means from said average distance at the predetermined time of transmission and for measuring the translation of said responsive means from said average distance at the later time of reception of said reflected energy; and
    means modifying the measured round-trip distance in accordance with said translations to provide the average distance of said transmitting means and said responsive means to said reflecting surface.

2. In combination:
    means transmitting sonic energy at a time of transmission toward an energy reflecting surface at a first distance;
    said reflecting surface reflecting said transmitted sonic energy to provide reflected energy;
    means receiving the reflected energy reflected from said surface at a time of reception at a second distance;
    means for summing said first and second distance to provide an apparent distance to said reflecting surface from said transmitting means and from said reflecting surface to said receiving means;
    said transmitting means and said receiving means undergoing translation along a direction line between said reflecting surface and said transmitting and receiving means, respectively, during the time said transmitted sonic energy is being propagated over the sum of said distances;
    means for establishing an average position of said transmitting means and said receiving means from said reflecting surface;
    means measuring the translation of said transmitting means from said average position at the time of transmission and for measuring the translation of said receiving means at the time of reception of said reflected energy; and
    means algebraically summing said transmitting and receiving means translations with the apparent distance to provide the distance from said surface to the average position of said transmitting means and said receiving means.

3. In combination:
    means transmitting sonic energy toward an energy reflecting surface;
    means receiving an energy signal reflected from said surface for measuring the sum of the distance between said transmitting means and said reflecting surface and the distance between said receiving means and said reflecting surface;
    said transmitting and receiving constituting a transmit/receive cycle;
    said transmitting means and said receiving means being at an average distance from said reflecting surface;
    said transmitting means and said receiving means undergoing heave relative to the average distance to said reflecting surface along a transverse direction between said reflecting surface and said transmitting means and said receiving means;
    means repetitively generating a key pulse;
    means measuring the polarity and magnitude of the heave of said transmitting means from the average distance at the time of said key pulse to provide a transmit heave value and for measuring the polarity and magnitude of the heave of said receiving means at a time of expected reception of said reflected energy to provide a receive heave value;
    said time of expected reception being provided by a true depth measurement of the preceding transmit/receive cycle;

means for storing said reflected energy in response to said key pulse;

means delaying said transmitting means relative to said key pulse by the transmitting means heave when said transmit means heave value is of one polarity and delaying activation of said means for storing when said transmit means heave value is of the opposite polarity;

means for shifting the reflected energy in said means for storing by the receiving means heave, said shift being in a direction determined by the polarity and in an amount determined by the magnitude of the receiving means heave; and means for reading out said shifted reflected energy signal from said means for storing to provide the average distance of said transmitting means and said receiving means from said reflecting surface.

4. A sonar heave compensation system comprising:

means for providing a key pulse;

means transmitting sonic energy toward an energy reflecting surface through a transmission medium in response to said key pulse;

said transmitting means and a receiving means moving transversely to said reflective surface and maintaining an average distance from said reflecting surface;

means for measuring the magnitude and polarity of the heave relative to said average distance of said transmitting means at the time of said key pulse;

said transmitting means being responsive without delay to said key pulse when said heave is of one polarity;

said receiving means receiving energy reflected from said surface;

means storing said received energy after a time corresponding to said transmit heave magnitude and the sonic velocity through said medium in response to said one polarity provided by said heave measuring means;

means responsive to an opposite polarity of said transmit heave at the time of the key pulse to provide a delay of transmission of sonic energy by said transmitting means relative to said key pulse, said delay corresponding to said heave magnitude;

said means responsive to said second polarity of said transmit heave causing said storing means to begin storing received signals at the time of said key pulse;

means for storing a depth value;

means providing an algebraic sum depth of said depth value and said transmit heave;

means providing a gate signal at a time corresponding to said sum depth measured from said key pulse;

means measuring the magnitude and polarity of the heave of said receiving means in response to said gate signal;

means shifting the contents of said storing means by the magnitude of said receiving means heave at said time and in a direction determined by the polarity of said receiving means heave at said time;

a chart recorder providing a pulse at the beginning of each line to be recorded;

means reading out the contents of said storing means in response to said chart recorder pulse and providing said contents to said recorder;

means detecting said received energy from said contents of said storing means to provide a value of heave-corrected depth measured from the time of said chart recorder pulse;

means for storing said heave-corrected depth; and said heave-corrected depth being provided to said algebraic sum providing means as said depth value on the next key pulse.

5. A sonar heave compensation system comprising:

means for providing a key pulse;

means transmitting sonic energy toward an energy reflecting surface through a transmission medium in response to said key pulse;

means receiving energy reflected from said surface;

said transmitting means and said receiving means moving with respect to said reflective surface and maintaining an average distance from said reflecting surface;

means for measuring the magnitude and polarity of the heave relative to said average distance of said transmitting means at the time of said key pulse;

means storing said received energy after a time corresponding to said transmit heave magnitude and the sonic velocity through said medium in response to one polarity provided by said heave measuring means;

means responsive to an opposite polarity of said heave at time of the key pulse to provide a delay of transmission of sonic energy by said transmitting means, said delay corresponding to said heave magnitude;

said means responsive to said opposite polarity of said heave causing said storing means to begin storing received signals at the time of said key pulse;

means for storing a depth value;

means providing a gate signal at a time corresponding to said depth value;

means measuring the magnitude and sign of the heave of said receiving means in response to said gate signal;

means shifting the contents of said storing means by the magnitude of said receiving means heave and in a direction determined by the sign of said receiving means heave;

a chart recorder providing a pulse at the beginning of each line to be recorded;

means reading out the shifted contents of said storing means in response to said chart recorder pulse and providing said shifted contents to said recorder;

means detecting said received energy from said shifted contents of said memory to provide a value of heave-corrected depth measured from the time of said chart recorder pulse;

means for storing said heave-corrected depth; and said heave-corrected depth being provided to means for storing a depth value at the occurrence of the next key pulse.

6. A method for removing heave error from a sonar depth finder system mounted on a ship and measuring the true depth to the ocean bottom comprising:

meausring the heave of the ship at the time of transmission of a sonic pulse;

measuring the heave of the ship at the time of reception of a sonic pulse reflected from said ocean bottom;

measuring the elapsed time between said transmission and said reception to thereby determine the apparent depth of the ocean bottom; and algebraically adding said heaves to said apparent depth to obtain a heave-corrected ocean bottom depth.

7. A method for removing heave error from a sonar ocean depth finder system mounted on a ship and meauring the true depth to the ocean bottom comprising:
 transmitting sonic pulses in said ocean;
 measuring the heave of the ship at a time of transmission of a sonic pulse;
 measuring the heave of the ship at a time of reception of the sonic pulse reflected from said ocean bottom;
 algebraically adding said time of transmission and reception heave measurements to provide a net heave;
 determining the measured depth by measuring the time between said time of transmission and said time of reception; and
 algebraically adding said net heave to said measured depth to obtain the true depth.

8. A method for sonar heave compensation comprising:
 providing a key pulse;
 measuring the magnitude and polarity of the transmit heave of said transmitting means at said key pulse;
 transmitting sonic energy toward an energy reflecting surface through a transmission medium in response to said key pulse with a delay dependent on the magnitude for one polarity of said transmit heave;
 receiving energy reflected from said surface;
 storing said received energy in a memory after a time corresponding to said transmit heave magnitude and the sonic velocity of said medium in response to said one polarity of said transit heave;
 providing a delay of transmission of sonic energy by said transmitting means in response to an opposite polarity of said transit heave at time of the key pulse, said delay corresponding to said heave magnitude;
 storing received signals at the time of said key pulse in response to said opposite polarity of said transit heave;
 storing a depth value;
 providing a gate signal at a time corresponding to said depth value;
 measuring the magnitude and polarity of the receive heave in response to said gate signal;
 shifting the contents of said memory by the magnitude of said receive heave at said gate signal and in a direction determined by the polarity of said receive heave;
 providing a chart recorder pulse at the beginning of each line to be recorded on a chart recorder;
 reading out the contents of said memory in response to said chart recorder pulse and providing said contents to said chart recorder;
 detecting said received energy from said contents of said memory to provide a value of heave-corrected depth; and
 storing said value of heave-corrected depth in place of said depth value.

9. A method for heave compensation of a sonar system carried on a ship for sea depth determination comprising:
 transmitting sonic energy through said sea from said ship;
 receiving the sonic energy signal reflected from the sea bottom;
 storing as a function of time in a memory said energy signal reflected from said sea bottom;
 measuring the transmit heave of said ship at a time of said energy transmission;
 measuring the receive heave of said ship at a time subsequent to said energy transmission, said time subsequent corresponding to a time of receiving the reflected sea bottom signal;
 measuring an elapsed time from the time of transmission to the time of receiving the reflected sea bottom signal to determine the measured depth of the sea bottom; and
 algebraically adding said transmit and receive heave measurements to said measured depth to obtain the true heave-corrected depth.

10. The apparatus of claim 1 wherein
said means measuring the translation of said transmitting means and said responsive means comprises an accelerometer responsive to a first signal at the time of transmission and to a second signal at the time of reception, respectively.

11. The apparatus of claim 2 wherein
said means measuring the translation of said transmitting means and said responsive means comprises an accelerometer responsive to a first signal at the time of transmission and to a second signal at the time of reception, respectively.

12. The apparatus of claim 3 wherein
said means measuring the translation of said transmitting means and said responsive means comprises an accelerometer responsive to a first signal at the time of transmission and to a second signal at the time of reception, respectively.

13. The apparatus of claim 4 wherein
said means for measuring transmit heave and receive heave comprises an accelerometer to said key pulse and to said gate signal, respectively.

14. The apparatus of claim 5 wherein
said means for measuring transmit heave and receive heave comprises an accelerometer responsive to said key pulse and to said gate signal, respectively.

15. The method of claim 6 wherein
said measuring of the transmit heave and the receive heave comprises using an accelerometer.

16. The method of claim 7 wherein
said measuring of the transmit heave and the receive heave comprises using an accelerometer.

17. The method of claim 8 wherein
said measuring of the transmit heave and the receive heave comprises using an accelerometer.

18. The method of claim 9 wherein
said measuring of the transmit heave and the receive heave comprises using an accelerometer.

* * * * *